United States Patent [19]

Pisani

[11] Patent Number: 4,906,387
[45] Date of Patent: Mar. 6, 1990

[54] METHOD FOR REMOVING OXIDIZABLE CONTAMINANTS IN COOLING WATER USED IN CONJUNCTION WITH A COOLING TOWER

[75] Inventor: Joseph Pisani, Sierra Madre, Calif.
[73] Assignee: The Water Group, Inc., El Segundo, Calif.
[21] Appl. No.: 149,649
[22] Filed: Jan. 28, 1988
[51] Int. Cl.[4] .................................................. C02F 1/32
[52] U.S. Cl. .................................. 210/748; 210/759; 210/765; 210/766
[58] Field of Search ............... 210/748, 759, 765, 766, 210/136, 194, 205, 206, 758, 764

[56] References Cited

U.S. PATENT DOCUMENTS

| | | | |
|---|---|---|---|
| 2,660,564 | 11/1953 | Davis | 252/62 |
| 2,832,545 | 4/1958 | Seagraves | 241/1 |
| 3,504,945 | 4/1970 | Liebundgut et al. | 302/40 |
| 3,538,803 | 11/1970 | Joseph et al. | 83/701 |
| 3,674,216 | 11/1972 | Blair | 241/18 |
| 4,012,321 | 3/1977 | Koubek | 210/759 X |
| 4,053,110 | 10/1977 | Schalkowsky et al. | 241/1 |
| 4,069,153 | 1/1978 | Gunther | 210/748 |
| 4,144,152 | 3/1979 | Kitchens | 204/158 R |
| 4,179,347 | 12/1979 | Krause et al. | 210/748 X |
| 4,284,245 | 8/1981 | Fishgal | 241/40 |
| 4,363,215 | 12/1982 | Sharp | 210/759 X |
| 4,402,837 | 9/1983 | Okugawa | 210/766 X |
| 4,506,834 | 3/1985 | Ek | 241/1 |
| 4,640,782 | 2/1987 | Burleson | 210/748 |
| 4,752,401 | 6/1988 | Bodenstein | 210/748 X |

OTHER PUBLICATIONS

"Innovative Oxidation Technology for Waste Pretreatment", Peterson Zaleiko, Water Engineering, Feb. 1981.

*Primary Examiner*—Tom Wyse
*Attorney, Agent, or Firm*—Thomas I. Rozsa

[57] ABSTRACT

A method and apparatus for removing oxidizable contaminants in cooling waters used to extract heat from the condenser coils of cooling towers. The method and apparatus includes means for removing a portion of the recirculating water which passes through the cooling tower to create a slipstream of water to be treated and treating the slipstream water with chemical to provide a hydroxyl free radical into the water to enhance oxidation, inducing cavitation in the slipstream water and irradiating the slipstream water with ultraviolet radiation to thereby cause the oxidizable contaminants to be oxidized and therefore removed before the slipstream water is reintroduced back into the cooling tower.

7 Claims, 1 Drawing Sheet

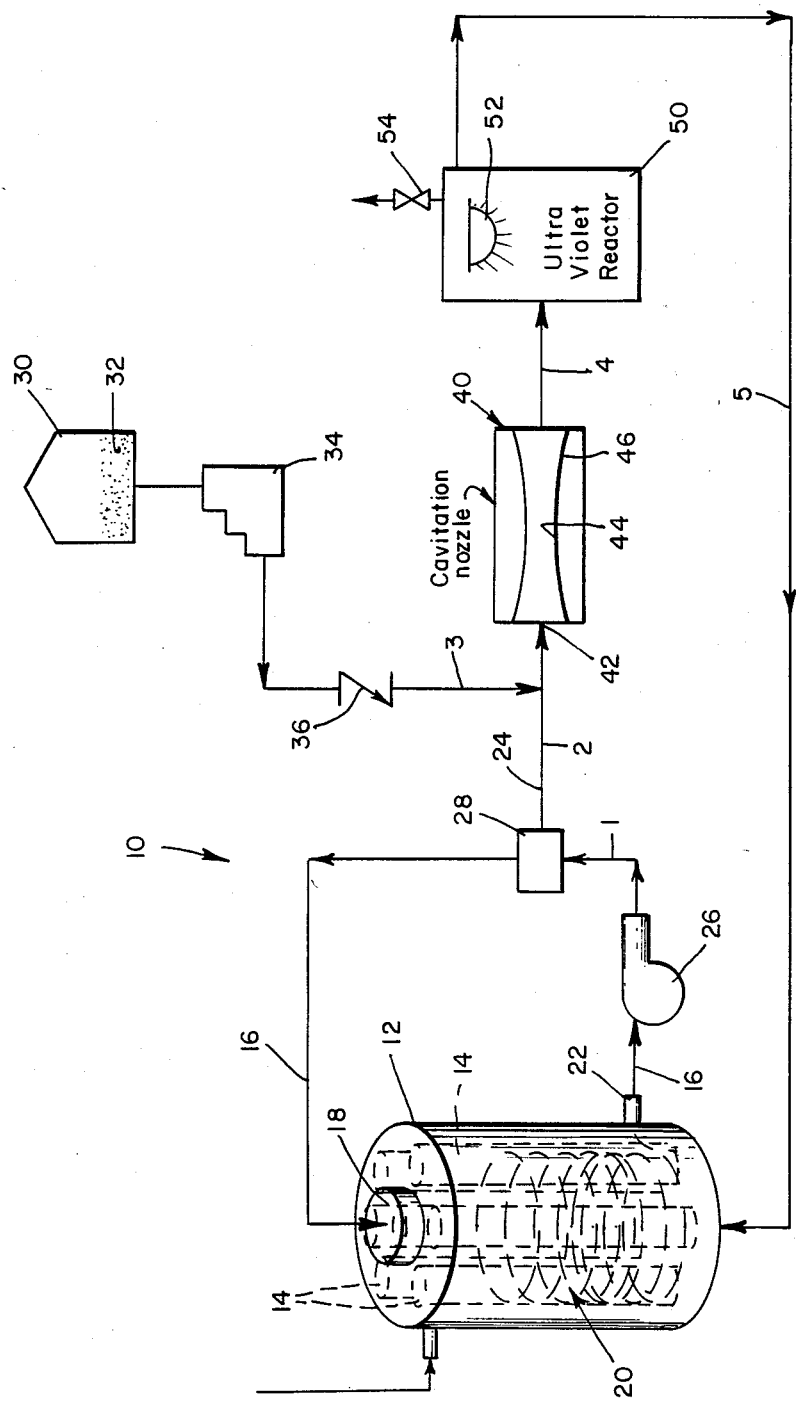

METHOD FOR REMOVING OXIDIZABLE CONTAMINANTS IN COOLING WATER USED IN CONJUNCTION WITH A COOLING TOWER

BACKGROUND OF THE INVENTION

1. FIELD OF THE INVENTION

The present invention relates to a method and apparatus for removing oxidizable contaminants in cooling water used in conjunction with a cooling tower. A general principal of science is that on passing from a liquid to a vaporous state, every liquid absorbs heat and subsequently gives off this heat again on condensing back into a liquid from the vapor state. In cooling apparatus employing this principal, a liquid is converted to a vapor state to absorb the heat and provide the required cooling. The vapor is then passed to a condenser where the vapor is re-converted into the liquid in order to go through a subsequent cooling operation. When the vapor is converted back into a liquid in the condenser, heat is generated. In order for the condenser to operate efficiently, this heat must be removed from the condenser coils. Cooling waters are used to run over condenser coils in a cooling tower, to thereby create a heat exchange process and transfer heat from the condenser coils to the water. The cooling water is exposed to air where the heat absorbed by the cooling water is dissipated into the atmosphere. The recirculating cooling water is usually drawn from a standard source such as public water, which may contain microorganisms and other contaminants. Through running over the condenser coils and exposure to the atmosphere during the heat dissipation process, the recirculating water becomes further impregnated with microorganisms and other contaminants. The microorganisms and contaminants in the water serve to corrode the condenser coils while the cooling water runs over them. This corrosion impairs the heat exchange process and further creates costly downtime during which the condenser coils must be cleaned or replaced. Some of the impurities can be removed through conventional filters. However, many organic impurities and other inorganic solids are not removed by conventional filtering means. The present invention provides a system whereby the impurities are significantly reduced and/or removed from the recirculating water to thereby substantially reduce the corrosive effect on the condenser coils.

2. DESCRIPTION OF THE PRIOR ART

One key element of the present invention purification process involves the concept of reducing the oxygen demand in the recirculating water stream. Since the contaminants which are not removed by conventional filtering systems are usually oxidizable materials, the oxidation of such materials serves to degrade and eliminate them. This concept is described in general terms in the paper "Innovative Oxidation Technology for Waste Pretreatment", by Stanley A. Peterson and Nicholas S. Zaleiko, which was published in the February 1981 issue of Water/Engineering and Management ("Oxidation Article"). The method described in the Oxidation Article is an improvement over a previously known "wet oxidation process" which is used to treat municipal and industrial aqueous effluents containing oxidizable organic compounds. The wet oxidation process comprises forcing compressed air through the heated effluents (heated to temperatures of 150 degrees centigrade to 320 degrees centigrade) under pressure (300 to 3000 psig) in the presence of cupric ion as an oxidation catalyst. Under conditions of the process, organic compounds present in the effluent are degraded by sequential oxidation to carbon dioxide, water and refractory organic compounds such as formic and acetic acids. Additional treatments are required to remove the refractory organic compounds. As discussed in the Oxidation Article, the process described therein includes subjecting the liquid to be purified to cavitation, adding a free radical initiator, including supplementary cavitation and exposing the liquid to ultraviolet (UV) light. When cavitation is applied, the bubble explosion in cavitation ruptures the thin cell membrane of microorganisms. In addition to oxidation by the free radical, the exposure to ultraviolet light provided for additional free radical oxidation.

The process discussed in the oxidation Article was further described in a patent application filed by Nicholas Zaleiko entitled Method and Apparatus For Oxidative Degradation of Water Contaminants. That application was subsequently abandoned.

The above referenced application and the Oxidation Article concentrated on removing impurities from waste waters and specifically concerned the following:

(1) Oxidation of process chemicals such as dyes, fatty acids, sludges and certain organics;

(2) Sanitary and industrial wastewater treatment at remote locations;

(3) Specific industrial wastes such as cyanides, sulfites, phenols, fat renderings, food processing pigments, pharmaceutical, soft drink and alcohol-type wastes;

(4) Pulp and paper bleaching and processing;

(5) Semicatalytic oxidation of refractory compound such as those from plating and photographic wastes;

(6) Treatment of various in-plant side streams such as digester supernatant and thickener overflows;

(7) Destruction and treatment of septic wastes.

This prior art process concentrated on the above applications and did not expand the treatment process to other applications such as Cooling Towers. In addition, inventor Zaleiko included several complicated steps such as heating the liquid. The present invention greatly simplifies the process and utilizes it in a new and non-obvious application.

The inventor is also aware of the following prior art patents which relate to various purification and treatment processes:

1. U.S. Pat. No. 2,722,498 issued to Morrell et al. in 1955 for "Process For Separating Organic Material From Inorganic Material".

2. U.S. Pat. No. 3,288,295 issued to Kelly in 1966 for "Tank Cover Structures".

3. U.S. Pat. No. 3,401,115 issued to Meyer et al. in 1968 for "Sewage Treatment System".

4. U.S. Pat. No. 3,480,543 issued to Hildebrand in 1969 for "Process And Apparatus For Disinfection Of Sewage".

5. U.S. Pat. No. 3,672,823 issued to Boucher in 1972 for "Method Of Sterilizing Liquids".

6. U.S. Pat. No. 3,677,409 issued to Ferm et al. in 1972 for "Sewage Treatment System".

7. U.S. Pat. No. 4,013,552 issued to Kreuter in 1977 for "Sewage Treatment Process".

8. U.S. Pat. No. 4,076,617 issued to Bybel et al. in 1978 for "Sonic Cavitation And Ozonation Of Waste Material".

9. U.S. Pat. No. 4,144,152 issued to Kitchens in 1979 for "Dehalogenation Of Halogenated Compounds".

The processes described in the above patents differ from the Oxidation Article and the abandoned Zaleiko patent application, and also differ from the specific application to Cooling Towers of the present invention.

The inventor is also aware of the following patents which disclose various apparatus and/or methods by which cavitation and other shock treatments are employed in a cleaning process:

1. U.S. Pat. No. 2,660,564 issued to David in 1953 for "Method Of Reducing The Density Of Aerogels And Similar Materials".
2. U.S. Pat. No. 2,832,545 issued to Segraves for "Supersonic Jet Grinding Means And Method".
3. U.S. Pat. No. 2,911,787 issued to Barry in 1959 for "Inlet Probe".
4. U.S. Pat. No. 3,265,090 issued to Elliott in 1966 for "Fluid Flow Controller".
5. U.S. Pat. No. 3,278,165 issued to Gaffney in 1966 for "Method And Apparatus For Generating Acoustic Vibrations In Flowing Fluids".
6. U.S. Pat. No. 3,504,945 issued to Leibundgut et al. in 1970 for "Pneumatic Conveyor System".
7. U.S. Pat. No. 3,538,803 issued to Joseph in 1970 for "Cavitation Machining Apparatus".
8. U.S. Pat. No. 3,674,216 issued to Blair in 1972 for "Treating Liquid Waste Effluent".
9. U.S. Pat. No. 4,053,110 issued to Schalkowsky et al. in 1977 for "Shock Press".
10. U.S. Pat. No. 4,284,245 issued to Fishgal in 1981 for "Machine Lubrication System".
11. U.S. Pat. No. 4,506,834 issued to Ek in 1985 for "Method And Device For Dispersing Material".

While there are many prior art references dealing with the inducement of cavitation and other shock effects utilized in purification processes, none of the references disclose the concept of the present invention treatment process used in conjunction with cooling towers.

Much work has been done on microbial control and treatment systems employing chemicals to destroy the micro-organism present in recirculating water. These systems, commonly used in large water re-circulation systems are chemical treatment processes involving oxidation of the organic material, have a high cost and maintenance as well as presenting some hazard to the operators.

A need has developed for a compact and reliable treatment system employing free-radical chemical reaction capabilities of auto-oxidation of both organic and inorganic materials present in water enhanced by the addition of catalysts so that the reactions can be induced to rapid completion by high energy transfer. Prior art of aerobic or chemical treatment systems have not satisfied the need.

There exists a significant need to clean the recirculating water system of cooling towers by an efficient and cost effective process to thereby (i) enhance the cooling tower operation by eliminating the rusting of the condenser coils which rusting degrades the heat transfer process and (ii) further reduce down time maintenance to clean or replace rusted condenser coils.

SUMMARY

The present invention includes a modular self contained unit for microbial control and contaminant removal of cooling tower re-circulation water and other recirculating water exposed to air. The present invention combines the energy of cavitation synergistically with ultraviolet radiation to induce free radical oxidation of the contaminants.

The present invention relates to an apparatus and method for oxidizing and degrading microorganisms, organic and inorganic contaminants in cooling waters. The water containing contaminants is subjected to degradation, in a semi-closed loop in which cavitation causes sonic implosions. The oxidation and degradation is enhanced by the reaction of the contaminants with free radicals created both by the sonic implosions caused by cavitation and the ultraviolet stimulation in the presences of dissolved hydroxyl free radical (such as from dissolved air).

This invention relates to a method for microbial and contaminant control or disinfection of liquids or liquid streams by combining the effect of ultraviolet energy with cavitation under carefully defined contact time and energy levels. The use of commercially available ultraviolet radiations, having wavelengths of between 2000 A and 3100 A have been used for water purification. Commercially available ultraviolet sterilization of liquids is restricted by the radiant energy and the clarity of the processed fluid.

Strong bacterial effects are believed to be produced by the high energy photon release in the region of 2000 A to 3100 A due to the correlation with the absorption, in this region, of DNA and nucleic acid. To obtain a strong bactericidal effect, one must release a certain number of quanta which is absorbed by the microorganism and which in turn penetrates the micro-organism and be of sufficient magnitude to initiate and maintain a given photochemical reaction.

Quanta with sufficient energy which can be released through a liquid depends on the degree of transmission of the ultraviolet energy through the liquid. It also depends to a great extent upon the turbulence level in the liquid. K. Dohnalik (Gas. Voda Tech. Sanit. 39, 14–16, 1965) says, in the case of water, the ultraviolet transmission is an inverse function of its mineral and organic content. Iron salts have a greater effect on the ultraviolet absorption than other salts and alkali salts seem to have little effect. Ultraviolet transmission in water, t, varies exponentially with liquid depth, d, and the absorption coefficient, a, according to:

$$t = e^{-ad}$$

Consequently, efficient coupling of the ultraviolet energy through water at the distances normally used in industrial sterilizing systems require low absorption coefficient.

By coupling ultraviolet radiation with cavitation induced free radical oxidation, a method for providing an optimum kill rate is presented in this invention.

"Cavitation" is a phenomenon in which the formation and collapse of small bubbles takes place through the entire liquid. It may be produced in a number of ways. The method selected in this invention is the use of a cavitation "critical flow" nozzle. The bubbles created by the cavitation nozzle are formed when the pressure of the liquid is lower than the vapor pressure of the liquid causing a vapor bubble to form and then collapse as the pressure equilibrates, imparting a very large amplitude shock wave (up to several hundred atmospheres) with local temperatures up to many hundred degrees centigrade. Some electrical discharges are also believed to occur during the collapsing phase.

Both water molecules and the water borne microorganisms (pathogens, viruses, fungi, algae and spores) exposed to cavitation shock waves of the type described above, should be considered here. It is known that the chemical bonds of molecules are broken by these conditions, leading to free radical capable of inducing oxidation of these micro-organisms through the formation of bactericidal compounds such as peroxides, hydroxyl radicals, oxygen and hydrogen atoms initiating several types of free radical chemical reactions. As described in the Zaleiko Article, cavitation induces ionization within the collapsing bubbles. The hydroxyl radical is formed at the inner surfaces of the vacuum bubbles and the surrounding liquid. Organics and oxidizable material present are diffused into the bubbles and the oxidation initiates during the collapse. The oxidation is chain-reaction in nature in the presence of dissolved oxygen. In addition to the oxidation effects produced, cavitation has been shown to be a significant destructive force in the breakdown of a biomass present in septic wastes and organic sludges which contains many organisms possessing a thin shell membrane. The membrane is cellular in nature and is made up primarily of protein material; when cavitation is applied, the outer protective shell along with the cell wall ruptures. The result is cell disruption and initial oxidation of the suspended solids in the liquid.

Therefore, it has been discovered, according to the present invention, that the efficiency of operation of a cooling tower can be substantially enhanced by purifying the recirculating stream of water which flows over to the condenser coils and removing oxidizable contaminants therefrom, to thereby reduce and/or eliminate the rusting of condenser coils.

It has also been discovered, according to the present invention, that the most efficient way to remove oxidizable contaminants from the recirculating water is to remove a portion of the water from the recirculating stream, add a reaction initiator such as peroxide to the water to provide a hydroxyl free radical in the water, thereafter induce cavitation in the water, and thereafter subject the water to ultraviolet radiation, and then return the purified water to the cooling tower.

It is therefore an object of the present invention to provide a method and apparatus for oxidizing certain oxidizable contaminants in the recirculating water stream of a cooling tower to thereby remove these contaminants from the water stream and thereby provide for a cleaner operating environment.

It is another object of the present invention to provide recirculating water free of oxidizable contaminants to be used in conjunction with a cooling tower to thereby at least reduce and possibly eliminate rusting of the condenser coils. This will substantially improve the heat transfer process of the condenser coils and will further significantly reduce the amount of down time required to maintain the cooling towers.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

The FIGURE is a flow diagram of the present invention method and apparatus for purifying liquids used in conjunction with a cooling tower.

DETAILED DESCRIPTION OF THE PREFERRED EMBODIMENT

Although specific embodiments of the invention will now be described with reference to the drawing, it should be understood that such embodiment is by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring to the FIGURE, there is shown overall at 10 a flow diagram for the present invention apparatus for purifying liquids used in conjunction with a cooling tower. A conventional cooling tower is shown at 12 and includes a multiplicity of conventional condenser coils 14. A liquid such as water 16 is allowed to flow into the cooling tower 12 through an inlet header 18 and circulates around and over the condenser coils through a multiplicity of loops 20 during which the heat exchange process occurs. The water 16 then exits the cooling tower through a water outlet 22. In a conventional cooling tower, the water 16 is exposed to air into which absorbed heat is released and the water is then recirculated through the cooling tower via water line number 1 as shown in FIG. 1 and new water 16 from a source is also circulated through the loops around and over the condenser coils.

The present invention involves the utilization of a specialized simplified purification process for cooling water used in conjunction with the cooling tower. A slipstream 24 of re-circulation water 16 is drawn from the discharge of re-circulation pump 26. The slipstream flow 24 is controlled by using a critical flow nozzle 28 so that a small fraction of the recirculating water flow 16 is allowed to flow into the purification slipstream 24 along water line number 2. After entering the slipstream, the water 24 is treated with a chemical to provide a hydroxyl free radical into the water, such as a chemical which creates a free radical to induce oxidation. The ratio of chemical to water is the range of approximately 4–200 ppm (parts per million). A chemical storage means or tank 30 houses the desired chemical 32 which is dispensed in measured quantities from the storage tank 30 through a chemical metering pump 34. A check valve 36 is placed in the line number 3 between the chemical metering pump 34 and the slipstream water 24 to prevent flow from returning to the pump and chemical tank. The chemical addition is made immediately upstream of a cavitation nozzle. By way of example, the chemical 32 may be $H_2O_2$ (Peroxide). The chemically treated slipstream water 24 then enters a conventional cavitation nozzle 40. Chemically treated slipstream water 24 enters the cavitation nozzle through inlet 42 and passes through throat 44. Upon exiting throat 44 in chamber 46, the cavitation is induced into the water 24. The chemically treated slipstream water 24 in which cavitation has been induced is then allowed to flow along water line number 4 into an ultraviolet (U.V.) reactor chamber or reactor 50 which houses an ultraviolet lamp 52. In the preferred embodiment, the retention time in the ultraviolet reaction chamber 50 is approximately two (2) minutes or less. In the preferred embodiment, the ultraviolet lamp 52 is either 254 nanometers or 185 nanometers. During the course of the reactions which occur in the ultraviolet reactor, gases may evolve. Therefore, a vent valve 54 is placed in the reactor to allow gases to be vented. The treated water 24 is discharged from the ultraviolet reactor 50 to water line 5 and returned to the cooling tower basin for re-circulation by pump 26. Through this continuous process where random slipstreams of water are treated, and through this self sustaining and auto-oxidation reaction induced by both cavitation and ultraviolet radiation, complete oxidation of the organic contaminants is achieved through the progressive recycling of contaminated water. The number of recycles of the basin water 16 is a function of the contaminant level of organics and microorganisms in the water.

The present invention includes both the method and apparatus for performing the above described purification process. The present invention involves a method for removing oxidizable contaminants in cooling water 16 used to extract heat from the condenser coils 14 of a cooling tower 12 comprising: (a) recirculating the cooling water 16 after passage through the cooling tower 12; (b) removing a portion of the recirculated cooling water 16 through a slipstream 24; (c) treating the portion of cooling water in the slipstream 24 with a chemical means to provide a hydroxyl free radical into the cooling water 24 to thereby enhance oxidation of the oxidizable contaminants contained in the slipstream water 24; (d) inducing cavitation in the treated slipstream water 24 by causing the slipstream water 24 to flow through a cavitation nozzle 40; (e) irradiating the cavitated treated slipstream water with ultraviolet radiation by causing the cavitated treated slipstream water to flow into an ultra violet reactor 50 and be subjected to irradiation through an ultra violet lamp 52; (f) re-introducing the irradiated, cavitated, chemically treated slipstream water into the cooling tower 12 for another cycle through the cooling tower 12 and re-circulation water stream 16; (g) repeating steps b through f by continuously removing randomly selected slipstreams 24 from the re-circulation water streams 24 and chemically treating, cavitating and irradiating the selected slipstream water before reintroduction back onto the cooling tower; whereby the combination of chemical treatment, cavitation and ultraviolet radiation serve to oxidize and thereby remove the oxidizable contaminants contained in the slipstream water. By way of example, the chemical may be peroxide. By way of example, the ratio of volume of added peroxide to slipstream water is 4 to 200 parts per mission. In the preferred embodiment, the slipstream water is irradiated with ultraviolet radiation for less than two minutes. The ultraviolet lamp may be either 254 or 185 nanometers.

The present invention also involves an apparatus for removing oxidizable contaminants in cooling water 16 used to extract heat from the condenser coils 14 of a cooling tower comprising: (a) means for recirculating the cooling water 16 after passage through the cooling tower 12, which means may comprise a water flow re-circulation line 1 including a re-circulation pump 26; (b) means for removing a portion of the recirculated cooling water 16 through a slipstream 24 which means may comprise a critical flow nozzle 28 which diverts a portion of the recirculating water 16 discharged from the re-circulation pump 24 into a slipstream water line 2; (c) means for treating the portion of cooling water in the slipstream 24 with a chemical means to provide a hydroxyl free radical into the cooling water to thereby enhance oxidation of the oxidizable contaminants contained in the slipstream water, which chemical means further comprises: (i) a chemical storage tank 30 containing a quantity of treating chemical 32, (ii) a chemical metering pump 34 connected to the chemical storage tank; and (iii) a chemical feed line 3 connecting the chemical metering pump 34 to the slipstream water line 2, whereby treating chemical 32 is discharged from the chemical storage tank 30 by the chemical metering pump 32 which feeds the treating chemical 32 through the chemical feed line 3 into the slipstream water line 2. In addition, a check valve 36 may be located in the chemical feed line 3 to prevent a backflow of water from the slipstream water line 2 into the chemical metering pump 34; (d) means for inducing cavitation in the treated slipstream water 24 which means may be a cavitation nozzle 40 containing an inlet 42, a critical throat area 44 through which the slipstream water passes, and an opening or chamber 46 after the critical throat area in which the cavitation is induced in the treated slipstream water; (e) means for irradiating the cavitated treated slipstream water with ultraviolet radiation which means may be an ultraviolet reactor 50 into which the slipstream water 24 is fed through line 4 and an ultraviolet lamp 52 housed within the ultraviolet reactor 50 and directed toward the slipstream water 24 contained within the ultraviolet reactor 50; (f) means for re-introducing the irradiated, cavitated, chemically treated slipstream water into the cooling tower 12 for another cycle through the cooling tower 12 and re-circulation water stream 16 which means is a return water line 5 from the ultraviolet reactor 50 to the cooling tower; and repeating steps b through f by continuously removing randomly selected slipstreams from the re-circulation water streams and chemically treating, cavitating and irradiating the selected slipstream water before reintroduction back onto the cooling tower; (h) whereby the combination of chemical treatment, cavitation and ultraviolet radiation serve to oxidize and thereby remove the oxidizable contaminants contained in the slipstream water 24.

The advantages of implementing the present invention purification process in conjunction with the cooling tower is:

1. Direct cost saving by operating a more efficient heat exchange process;

2. Elimination of the need to handle toxic gaseous chemical biocides since these are oxidized by the combination of the free radical introduced through chemicals coupled with cavitation and ultra violet treatment.

3. Reduction or elimination of toxic waste discharge from blowdown.

4. Water conservation resulting from reduction of blowdown.

5. Reduction of organic contaminants, coupled with increased efficiency of heat transfer equipment.

6. Reduction of disease-spreading microorganisms such as Legionella.

7. No toxic chemical residue in the treated water.

8. Significantly reduced corrosion of the condenser coils due to the purification of the re-circulation water running over and around the coils.

9. Significantly reduced downtime of the cooling tower.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A method for removing oxidizable contaminants in cooling water used to extract heat from the condenser coils of a cooling tower comprising:
   a. recirculating the cooling water after passage through the cooling tower;
   b. removing a portion of the recirculated cooling water through a slipstream;
   c. treating the portion of cooling water in the slipstream with a means to provide a hydroxyl free radical into the cooling water;
   d. inducing cavitation in the treated slipstream water by causing the water to flow through a cavitation critical flow nozzle wherein the pressure of the treated slipstream water is lower than the vapor pressure of the treated slipstream water causing a vapor bubble to form and then collapse as the pressure equilibrates, imparting a very large amplitude shock wave with local temperatures of several hundred degrees to thereby create substantial additional hydroxyl free radicals in the treated slipstream water to further act as oxidizing agents;
   e. irradiating the treated slipstream water which now comprises substantial hydroxyl free radicals with ultraviolet radiation by causing the cavitated treated slipstream water to flow into an ultraviolet reactor and be subjected to irradiation through an ultraviolet lamp; and
   f. re-introducing the irradiated, cavitated treated slipstream water into the cooling tower for another cycle through the cooling tower and recirculation water stream;
   g. whereby the cavitation process which creates substantial additional hydroxyl free radicals in addition to the treating means which provides a hydroxyl free radical serves to oxidize the oxidizable organic contaminants in the slipstream water and the irradiation with ultraviolet radiation serves to continue the oxidation process initiated by the hydroxyl free radicals to fully oxidize the oxidizable organic contaminants and thereby remove the oxidizable organic contaminants contained in the slipstream water so that the slipstream water is purified.

2. A method for removing oxidizable contaminants in cooling water used to extract heat from the condenser coils of a cooling tower comprising:
   a. recirculating the cooling water after passage through the cooling tower;
   b. removing a portion of the recirculated cooling water through a slipstream;
   c. treating the portion of cooling water in the slipstream with a chemical means to provide a hydroxyl free radical into the slipstream water to thereby enhance oxidation of the oxidizable contaminants contained in the slipstream water cooling water;
   d. inducing cavitation in the chemically treated slipstream water by causing the water to flow through a cavitation critical flow nozzle wherein the pressure of the treated slipstream water is lower than the vapor pressure of the chemically treated slipstream water causing a vapor bubble to form and then collapse as the pressure equilibrates, imparting a very large amplitude shock wave with local temperatures of several hundred degrees to thereby create substantial additional hydroxyl free radicals in the chemically treated slipstream water to further act as oxidizing agents;
   e. irradiating the cavitated chemically treated slipstream water which now comprises substantial hydroxyl free radicals with ultraviolet radiation by causing the cavitated chemically treated slipstream water to flow into an ultraviolet reactor and be subjected to irradiation through an ultraviolet lamp; and
   f. re-introducing the irradiated, cavitated, chemically treated slipstream water into the cooling tower for another cycle through the cooling tower and recirculation water stream;
   g. repeating steps b through f by continuously removing randomly selected slipstreams from the recirculation water streams and chemically treating, cavitating and irradiating the selected slipstream water before reintroduction back into the cooling tower;
   h. whereby the cavitation process which creates substantial additional hydroxyl free radicals in addition to the chemical treating means which provides a hydroxyl free radical serves to oxidize the oxidizable organic contaminants in the slipstream water and the irradiation with ultraviolet radiation serves to continue the oxidation process initiated by the hydroxyl free radicals to fully oxidize the oxidizable organic contaminants and thereby remove the oxidizable organic contaminants contained in the slipstream water so that the slipstream water is purified.

3. The method in accordance with claim 2 wherein said chemical is peroxide.

4. The method in accordance with claim 3 wherein the ratio of volume of added peroxide to slipstream water is 4 to 200 parts per million.

5. The method in accordance with claim 2 wherein the slipstream water is irradiated with ultraviolet radiation for less than two minutes.

6. The method in accordance with claim 2 wherein the wavelength of said ultraviolet lamp is 254 nanometers.

7. The method in accordance with claim 2 wherein the wavelength of said ultraviolet lamp is 185 nanometers.

* * * * *